Figure 1:
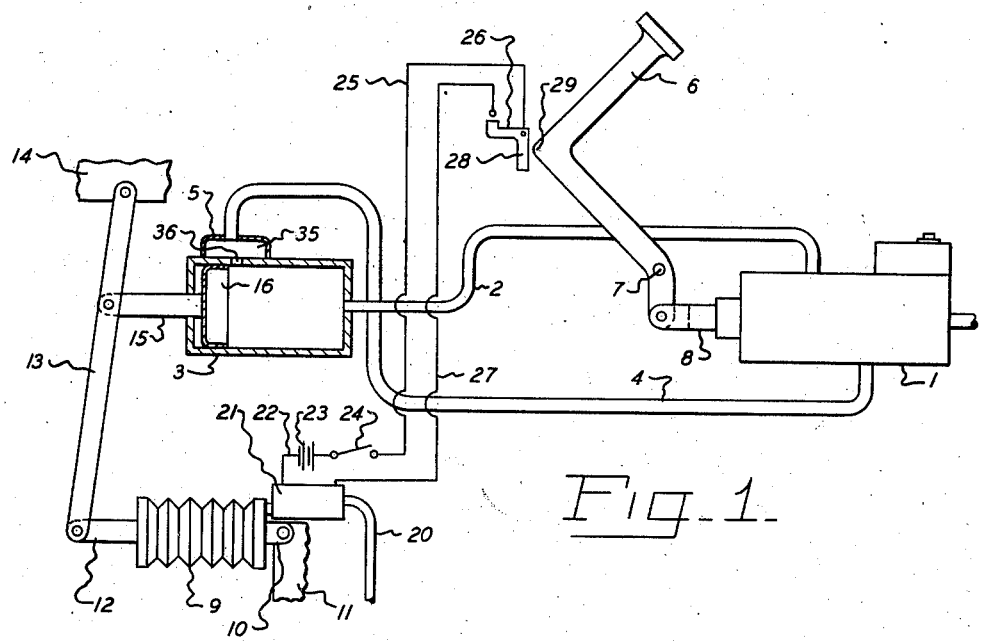

Sept. 3, 1946.  G. E. PORTER  2,407,097

BRAKE MECHANISM

Filed Feb. 10, 1943

Inventor

GILBERT E. PORTER

By Bearman & Langford

Attorneys.

Patented Sept. 3, 1946

2,407,097

UNITED STATES PATENT OFFICE 2,407,097

BRAKE MECHANISM

Gilbert E. Porter, Los Angeles, Calif., assignor to Leonard J. Rosa, Detroit, Mich.

Application February 10, 1943, Serial No. 475,336

10 Claims. (Cl. 188—152)

The present invention relates to hydraulic devices operated by the controlled application of hydraulic fluid and more particularly to hydraulic brake systems.

One of the primary objects of hydraulic brake design is to provide controls which result in the uniform application of the brakes and the avoiding of such undesirable characteristics as grabbing and slow release. One particular type of brake system which might be highly satisfactory except for the fact that the parts must be closely fitted thereby being subject to sticky valve action employs valves such as by-pass valves and unloading valves to disperse the fluid pressure when the brakes are not in use. If the parts are not closely fitted there is a danger of leakage. According to the present invention, the disadvantages of the prior art are eliminated by providing the system wherein there is no fluid pressure except at the time of brake operation. The pressure fluid is controlled by a master valve, under the control of the foot pedal. The arrangement is such that the only metering is done by the master control valve and this metering is of pressure fluid at its maximum pressure. In other words there is no metering of a vacuum.

An object of the present invention is to provide a hydraulic brake system of the character described wherein the use of by-pass and unloading valves for dispersing fluid pressure is eliminated.

Another object of the invention is to provide a brake system of the character described wherein vacuum is employed to develop fluid pressure and the only metering for controlling the operation of the brakes is of pressure fluid at its maximum pressure.

Still another object of the invention is to provide in combination with a master control valve, mechanism for substantially instantaneously supplying pressure fluid thereto at a predetermined maximum pressure.

A further object of the invention is to provide a master control valve having an outer tubular piston, a second piston telescoped within said outer tubular piston, and ports associated therewith for metering pressure fluid so as to cause said second piston to actuate a brake fluid pump piston and said outer piston to react against the foot of the operator.

A still further object of the invention is to provide a master control valve having an outer tubular piston, a second piston telescoped within said tubular piston, ports in said piston, and an actuator for said outer tubular piston for moving the same to control said ports to admit pressure fluid to a pressure chamber between one end of said tubular piston and one end of said inner piston to actuate said inner piston to provide braking action.

Figure 2:
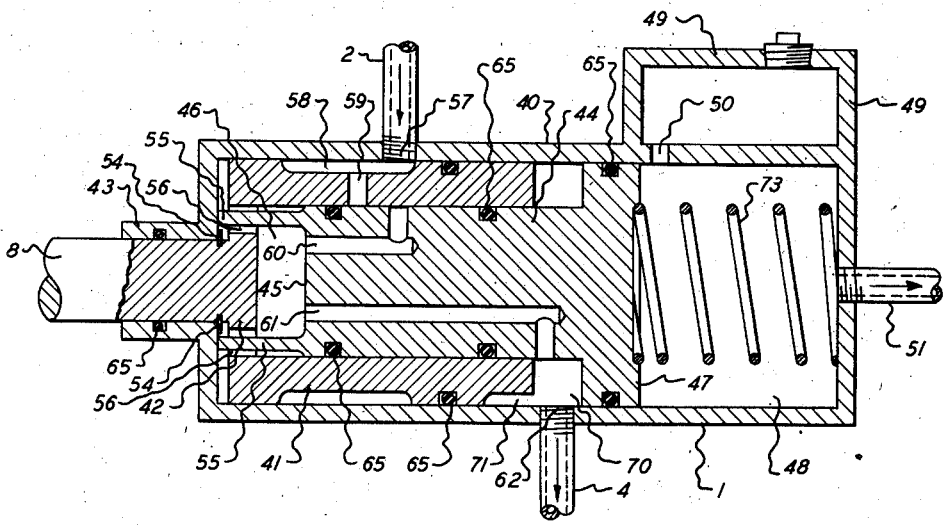

These and other objects residing in the arrangement, combination and construction of the parts will be apparent from the following specification when taken with the accompanying drawing, in which Fig. 1 is a diagrammatic representation of a brake system according to the present invention, and Fig. 2 is a vertical section of the master control valve shown as a part of the structure of Fig. 1.

Referring particularly to the drawing, the reference character 1 indicates a master control valve having an inlet conduit connection 2 with a pump cylinder 3 and a discharge conduit connection 4 with a reservoir 5 for the pump cylinder 3. The master control valve 1 is under the control of a foot pedal or brake lever 6 pivoted at 7 and having an end thereof pivoted to an actuator 8.

Pressure for forcing hydraulic fluid from the cylinder 3 through the conduit 2 to the master control valve 1 is generated by a vacuum motor 9 in the form of a bellows pivoted by a connection 10 to a fixed part 11. The end of the bellows 9 opposite the connection 10 is provided with an actuating arm 12 which is pivoted to one end of the lever 13. The other end of the lever 13 is pivoted to a fixed point 14. Intermediate the ends of the lever 13, a piston rod 15 is connected. The piston rod at the opposite end thereof is fixed to a piston 16 within the pump cylinder 3.

Vacuum for actuating the bellows 9 is conducted through a conduit 20 from a suitable source and is controlled by a vacuum valve 21 between the bellows 9 and the conduit 20. The vacuum valve 21 is electrically operated in some suitable manner not disclosed. The circuit for operating the vacuum valve 21 comprises a conductor 22, a source of power such as a battery 23, an ignition switch 24, a conductor 25, a brake pedal switch 26 and a conductor 27. The ignition switch 24 may be the conventional ignition switch of the vehicle with which the brake system is associated. The brake pedal switch 26 is provided with a projecting arm 28 in the path of movement of the portion 29 of the brake lever 6. Thus when the brake lever 6 is depressed, the switch 26 is closed to close the operating circuit for the vacuum valve 21 to connect vacuum from the conduit 29 to the bellows 9. This connection results in the lever 13 moving in a counterclockwise direction, as shown in Fig. 1, to drive the pump piston 16 to the right to force hydraulic fluid in the cylinder 3 through the conduit 2 to the master control valve 1.

The pump cylinder 3 is provided with a usual reservoir 35 on the top thereof and a port 36 is provided providing communication between the reservoir 35 and the cylinder 3. The port 36 is so located as to be covered up by the piston 16 immediately after the piston 16 starts to move to the right. Discharged hydraulic fluid from the master control valve 1 passes through the conduit 4 to the reservoir 35. It will be clear that at the completion of an operating cycle of the bellows 9 when the piston 16 is at the left of its path of movement, hydraulic fluid from the reservoir 35 will flow by gravity through the port 36 into the cylinder 3 to replenish the supply of hydraulic fluid therein.

The master control valve 1 is shown in detail in Fig. 2. The valve 1 comprises an outer cylinder 40 having disposed therein an outer tubular piston 41. The piston 41 is closed at one end by a head 42 and has projecting therefrom through the sleeve 43 of the cylinder 40, the actuator 8 disclosed generally in Fig. 1.

There is provided telescopically disposed within the tubular piston 41 a second piston 44. The inner end 45 of the second piston 44 is spaced in the relative position of the parts shown in Fig. 2 from the inner end of the head 42 of the tubular piston 41 to provide a pressure receiving chamber 46. The opposite end of the piston 44 is provided with a pump piston 47. The pump piston 47 is slidably disposed in a pump cylinder 48, the cylinder 48 being at the opposite end of the cylinder 40 from the sleeve 43 thereof. Associated with the pump cylinder 48 is a reservoir 49 of a conventional nature. Arranged in the wall of the cylinder 48 adjacent the reservoir 49 is a port 50 for permitting the gravity flow of hydraulic fluid from the reservoir 49 into the pump cylinder 48. The pump cylinder 48 is also provided with an outlet 51 for conducting hydraulic fluid under pressure developed by the piston 47 to hydraulic brakes or other mechanism to be actuated by hydraulic fluid under pressure.

Movement of the piston 41 to the left as viewed in Fig. 2 is limited by stops 54 on the actuator 8 abutting against the left end of the cylinder 40. Movement of the piston 44 to the left, as viewed in Fig. 2, is restricted by stops 55 projecting through openings 56 in the head 42 and abutting against the inside of the left end of the cylinder 40. The openings 56 further serve to provide free passage of hydraulic fluid to both sides of the head 42 so as to permit the free movement of the tubular piston 41 under the action of the actuator 8.

Hydraulic fluid under pressure from the pump 3 is conducted to the control valve 1 through the conduit 2 to a port 57 in the wall of the cylinder 40. Opposite the port 57 in the outer surface of the tubular piston 41 there is provided a relieved portion or shallow groove 58. The groove 58 is annular, extending completely around the piston 41 so as to balance pressure thereon. The groove 58 also provides communication between the port 57 and a port 59 extending from the groove 58 through one wall of the piston 41.

Arranged in the piston 44 is a port 60 providing communication between the pressure receiving chamber 46 and the outer surface of the piston 44. The port 60 has the portion thereof in the surface of the piston 44 in the path of movement of the port 59 through the piston 41. The piston 44 is also provided with a port 61, providing communication between the pressure receiving chamber 46 and a discharge port 62 through the wall of the cylinder 40, connected to the discharge conduit 4. It will be observed that the right end of the tubular piston 41 is adjacent the end of the port 61 communicating with the surface of the piston 44.

Each of the sliding surfaces between the actuator 8 and the sleeve 43, the cylinder 40, and and the piston 41, and the piston 44 and the piston 41, are in fluid tight contact. These surfaces are further provided with sealing rings 65 for insuring against leakage. A similar sealing ring 65 is provided in the outer periphery of the pump piston 47. The pump piston 47 is arranged adjacent the port 50 so as to close the port 50 upon the start of the travel of the pump piston 47.

The operation of the entire system is as follows: When pressure is applied by the foot to the brake lever 6, the switch 26 is closed to close the vacuum valve 21 to cause the bellows 9 to actuate the pump piston 16 to force hydraulic fluid under full pressure through the conduit 2 to the port 57. Continued downward movement of the lever 6 will cause the actuator 8 to move the piston 41 to cause the port 59 to register with the end of the port 60 at the surface of the piston 44. This registry will conduct pressure fluid from the conduit 2 into the pressure receiving chamber 46. At the same time the piston 41 has closed the end of the discharge port 61 in the surface of the piston 44 to prevent the escape of pressure fluid from the pressure receiving chamber 46. The pressure fluid in the pressure receiving chamber 46 causes the piston 44 to move to the right to move the pump piston 47 to the right which in turn forces hydraulic fluid from the pump cylinder 48 into the hydraulic fluid conduit 51 to brake or other mechanism to be actuated by the controlled hydraulic fluid.

With the operation as stated, should the brake pedal be held stationary after a predetermined downward movement, the second piston 44 moves ahead of the tubular piston 41 so as to cause the end of the port 60 in the surface of the piston 44 to move out of registry with the port 59 and thus shut off the supply of hydraulic fluid to the pressure receiving chamber 46. The positioning of the ports 59, 60 and 61, together with the position of the outer end of the piston 41 with respect to the position of the port 61 in the surface of the piston 44, is such that the piston 41 does not start to uncover the port 61 until after the port 59 has moved substantially out of registry with the port 60. In this manner the hydraulic fluid under pressure within the pressure receiving chamber 46 is trapped within the pressure receiving chamber 46, thereby holding the pressure generated in the pump cylinder 48 at its maximum value until the brake lever 6 is eased up to cause the actuator 8 to move to the left to further move the tubular piston 41 to the left to uncover the port 61 to permit the discharge of pressure fluid from the pressure receiving chamber 46 through the ports 61 and 62 to the discharge conduit 4.

In the operation of the brake system according to the present invention, should there be a failure of pressure fluid through the conduit 2, movement of the actuator 8 to the right under the action of the brake lever 6 will cause the head 42 of the outer tubular piston 41 to abut against the end 45 of the second piston 44, and bodily move the second piston 44 to the right, as viewed in Fig. 2, to move the pump piston 47 in the pump cylinder 48 to force hydraulic fluid through the conduit 51. In such a case the operation of the brake or other mechanism operated by the hydraulic fluid passing through the conduit 51 would be manual without the benefit of the power actuation. The pump cylinder 48 may be of such a diameter with respect to the diameter of the piston 44 as to serve as a debooster in a desired ratio. In this way the pressure of the hydraulic fluid in the conduit 51 may be provided at any degree independently of the pressure of the pressure fluid passing through the conduit 2.

A feature of the invention which is considered to be of importance is the fact that the pressure fluid in the pressure chamber 46 provides a net reaction on the actuator 8 in a direction against the operating movement of the brake lever 6, or in other words towards the left, as viewed in Fig. 2. This reaction provides a "feel" to the operator to indicate to him the extent of braking pressure being applied. This "feel" will be in direct proportion to the amount of pressure in the conduit 51.

During certain phases of the operation of the master control valve 1, an annular space 70 exists between the end of the tubular piston 41 and the pump piston 47. At other phases of the operation, the space 70 is partly or substantially closed. In order to permit the escape of discharge pressure fluid from said space, the tubular piston 41 is provided adjacent the port 62 with an undercut 71 extending from the outer end of the tubular piston 41 inwardly a sufficient distance to provide discharge communication between the space 70 and the port 62 communicating with the discharge conduit 4. Also the pump cylinder 48 has provided therein a spring 73 maintained under compression so as to urge the piston 44 continuously to the left. The spring 73 serves to return the pump piston 47 and the piston 44 to their starting position when foot pressure on the brake lever 6 is released. Suitable structure, not shown, may be employed to maintain the cylinder 48, the piston 41, and the piston 44 against relative rotation so as to maintain the desired alignment between the respective ports therein.

While it is desirable to operate the suction valve 21, disclosed in Fig. 1, by an electrical actuator, it is to be understood that this valve may be actuated by mechanical means operated by the brake lever 6. Also, instead of employing the bellows 9 for developing pressure for the pressure fluid, a suitable rotary pump or other device of conventional nature might be employed to develop the necessary pressure. Accordingly, I do not wish to be limited, except by the scope of the following claims.

I claim:

1. In a fluid operated device of the character described, for applying fluid under pressure to an expansible unit, and adapted to be controlled by actuating means, the combination of a fluid pressure receiving chamber having a wall movable by fluid pressure in said chamber, a fluid pressure transmitting chamber having a movable wall and an outlet port whereby movement of said wall will discharge fluid from said fluid transmitting chamber, a floating piston connecting said walls whereby the movement of said first named wall by fluid pressure in said fluid pressure receiving chamber will move said last named wall so as to discharge fluid from said fluid transmitting chamber through said outlet port, and means for controlled delivery of fluid under pressure into said fluid pressure receiving chamber, said means having a valve connecting a source of fluid under pressure to said fluid pressure receiving chamber, said valve comprising an outer piston having said first named piston telescoped therein, said pistons having coacting ports arranged so that when in conducting alignment fluid flows into said pressure receiving chamber and when not in conducting alignment fluid cannot flow into said pressure receiving chamber, said outer piston being connected to said actuating means for movement thereby and said first named piston moving in response to pressure in said pressure receiving chamber.

2. A device of the character described comprising a cylinder, a tubular piston disposed in said cylinder, a second piston telescoped in said tubular piston, an actuator connected to said tubular piston and extending through one end wall of said cylinder, a pump cylinder at the other end of said cylinder, a pump piston connected to one end of said second piston adjacent said pump cylinder and operative therein, a fluid discharge from said pump cylinder, a pressure fluid receiving chamber within said tubular piston and adjacent the other end of said second piston, pressure fluid in said pressure fluid receiving chamber moving said second piston to move said pump piston, a source of pressure fluid, and pressure fluid inlet and discharge ports under the control of said tubular piston for conducting pressure fluid to said pressure fluid chamber from said source and from said fluid pressure chamber for actuating said second piston to move said pump piston.

3. In a fluid operated device of the character described, for applying fluid under pressure to an expansible unit, and adapted to be controlled by actuating means, the combination of a fluid pressure receiving chamber having a wall movable by fluid pressure in said chamber, a fluid pressure transmitting chamber having a movable wall and an outlet port whereby movement of said wall will discharge fluid from said fluid transmitting chamber, a floating piston connecting said walls whereby the movement of said first named wall by fluid pressure in said fluid pressure receiving chamber will move said last named wall so as to discharge fluid from said fluid transmitting chamber through said outlet port, a source of vacuum, a vacuum motor, a pump, adapted to be actuated by said motor, constituting a source of fluid under pressure when actuated by said motor, an electrically controlled valve to control the connection of said source of vacuum to said motor, an electric circuit to control said valve, means for controlling said circuit by said actuating means, and means for controlled delivery of fluid under pressure into said fluid pressure receiving chamber, said last named means having a valve connecting said source of fluid under pressure to said fluid pressure receiving chamber, said valve comprising an outer piston having said first named piston telescoped therein, said pistons having coacting ports arranged so that when in conducting alignment fluid flows into said pressure receiving chamber and when not in connecting alignment fluid cannot flow into said pressure receiving chamber, said outer piston being connected to said actuating means for movement thereby and said first named piston moving in response to pressure in said pressure receiving chamber, whereby operative movement of said actuating means provides a source of fluid under pressure and controls the application of said last named fluid under pressure to said expansible unit.

4. A device of the character described comprising a cylinder, a tubular piston disposed in said cylinder, a second piston telescoped in said tubular piston, an actuator connected to said tubular piston and extending through one end wall of said cylinder, a pump cylinder, a pump piston connected to the end of said second piston away from said actuator and operative in said pump cylinder, a fluid discharge from said pump cylinder for conducting controlled pressure fluid, a pressure fluid receiving chamber within said tubular piston and adjacent the other end of said second piston, pressure fluid in said pressure fluid receiving chamber moving said second piston to move said pump piston, a vacuum motor, a source of vacuum adapted to be connected to said motor, a pump adapted to be actuated by said motor constituting a source of actuating pressure fluid when actuated by said motor, an actuating pressure fluid controlling valve controlled by said tubular piston for controlling the admission of pressure fluid to said pressure fluid chamber, a valve controlled by said tubular piston for discharging pressure fluid from said pressure fluid receiving chamber, a valve to control the connection of said source vacuum to said motor, and means for controlling said valve by said actuator.

5. A device of the character described comprising a cylinder, a tubular piston disposed in said cylinder, a second piston telescoped in said tubular piston, an actuator connected to said tubular piston and extending through one end wall of said cylinder, a pump cylinder at the other end of said cylinder, a pump piston connected to one end of said said second piston adjacent said pump cylinder and operative therein, a fluid discharge from said pump cylinder for conducting controlled pressure fluid, a pressure fluid receiving chamber within said tubular piston and adjacent the other end of said second piston, pressure fluid in said pressure fluid receiving chamber moving said second piston to move said pump piston, a port in said second piston providing communication between said pressure fluid receiving chamber and a side surface of said second piston, a port through a side wall of said tubular piston, a port through a side wall of said cylinder, a source of pressure fluid, a connection between said last named port and said source, said ports being in the same longitudinal path whereby a predetermined relative movement between said ports brings them into and out of register to connect said source to and to disconnect it from said pressure fluid receiving chamber, and other ports in said second piston and cylinder controlled by said tubular piston for discharging pressure fluid from said pressure fluid receiving chamber at predetermined relative positions of said pistons and cylinder whereby movement of said pump piston is controlled by actuation of said tubular piston by said actuator.

6. In a fluid operated device of the character described, for applying fluid under pressure to an expansible unit, and adapted to be controlled by actuating means, the combination of a fluid pressure receiving chamber having a wall movable by fluid pressure in said chamber, a fluid pressure transmitting chamber having a movable wall and an outlet port whereby movement of said wall will discharge fluid from said fluid transmitting chamber, a floating piston connecting said walls whereby the movement of said first named wall by fluid pressure in said fluid pressure receiving chamber will move said last named wall so as to discharge fluid from said fluid transmitting chamber through said outlet port, a source of vacuum, a pump constituting a source of pressure fluid when actuated, a vacuum motor for actuating said pump, means responsive to said actuating means for connecting said source of vacuum to said motor to atcuate said pump, and means for controlled delivery of fluid under pressure into said fluid pressure receiving chamber, said last means having a valve connecting a source of fluid under pressure to said fluid pressure receiving chamber for actuating said first named pump, said valve comprising an outer piston having said first named piston telescoped therein, said pistons having coacting ports arranged so that when in conducting alignment fluid flows into said pressure receiving chamber and when not in conducting alignment fluid cannot flow into said pressure receiving chamber, said outer piston being connected to said actuating means for movement thereby and said first named piston moving in response to pressure in said pressure receiving chamber.

7. A device of the character described comprising a cylinder, a tubular piston disposed in said cylinder, a second piston telescoped in said tubular piston, an actuator connected to said tubular piston and extending through one end wall of said cylinder, a pump cylinder at the other end of said cylinder, a pump piston connected to one end of said second piston adjacent said pump cylinder and operative therein, a fluid discharge from said pump cylinder for conducting controlled pressure fluid, a pressure fluid receiving chamber within said tubular piston and adjacent the other end of said second piston, pressure fluid in said pressure fluid receiving chamber moving said second piston to move said pump piston, a source of pressure fluid, and pressure fluid inlet and discharge ports under the control of said tubular piston for conducting pressure fluid to said pressure fluid chamber from said source, and from said fluid pressure chamber for actuating said second piston to move said pump piston, a source of vacuum, a pump constituting said source of pressure fluid when actuated, a vacuum motor for actuating said pump, and means responsive to said actuator for connecting said source of vacuum to said motor to actuate said pump.

8. In a fluid operated device of the character described, for applying fluid under pressure to an expansible unit, and adapted to be controlled by actuating means, the combination of a fluid pressure receiving chamber having a wall movable by fluid pressure in said chamber, a fluid pressure transmitting chamber having a movable wall and an outlet port whereby movement of said wall will discharge fluid from said fluid transmitting chamber, a floating piston connecting said walls whereby the movement of said first named wall by fluid pressure in said fluid pressure receiving chamber will move said last named wall so as to discharge fluid from said fluid transmitting chamber through said outlet port, and means for controlled delivery of fluid under pressure into said fluid pressure receiving chamber, said means having a valve connecting a source of fluid under pressure to said fluid pressure receiving chamber, a source of fluid pressure connected to said valve means, means responsive to initial movement of said actuator to supply substantially instantaneously pressure fluid from said source to said last named means at maximum pressure, said valve comprising an outer piston having said first named piston telescoped therein, said pistons having coacting ports arranged so that when in conducting alignment fluid flows into said pressure receiving chamber and when not in conducting alignment fluid cannot flow into said pressure receiving chamber, said outer piston being connected to said actuating means for movement thereby and said first named piston moving in response to pressure in said pressure receiving chamber.

9. In a hydraulic brake system, a manual actuator, a control valve, a source of hydraulic pressure, means to deliver the maximum pressure of said source to said control valve during the period of operation of said manual actuator, an operating connection between said valve and said manual actuator, a piston for developing and directing hydraulic pressure to the brakes, chambers on opposite sides of said piston, inlet ports in said valve and associated structure adapted to be brought into alignment to connect said source in one of said chambers with the maximum pressure of said source, a fluid return including alignable outlet ports in said valve and associated structure, said inlet and outlet ports being axially spaced to trap fluid under maximum pressure in said last chamber following movement of said valve by said actuator, whereby movement of said piston is arrested without the metering or by-passing of fluid.

10. In a hydraulic brake system, a manual actuator, a control valve, operatively connected to said actuator for axial movement, a piston for delivering and directing hydraulic pressure to the brakes, a housing in which said piston operates, chambers on opposite sides of said piston, a source of fluid pressure, inlet ports in said valve and piston to connect one of said chambers with said source on axial relative movement between said valve and piston to align said inlet ports, a fluid return, outlet ports in said piston and valve to connect said last chamber with said return in one relative position of said valve and piston, said inlet and outlet ports being so located as to seal said last chamber from said source and return to arrest movement of said piston under full operating fluid pressure without the metering or by-passing of the fluid.

GILBERT E. PORTER.